United States Patent [19]

Chun et al.

[11] Patent Number: 5,053,600

[45] Date of Patent: Oct. 1, 1991

[54] SLAG CHUTE SYSTEM

[75] Inventors: Victor L. Chun, Holland; George M. Jaworski, Bala Cynwyd, both of Pa.

[73] Assignee: Murata Wiedemann, Inc., King of Prussia, Pa.

[21] Appl. No.: 558,098

[22] Filed: Jul. 25, 1990

[51] Int. Cl.⁵ .............................................. B23K 9/00
[52] U.S. Cl. ..................... 219/121.48; 219/121.39; 219/121.49; 266/65
[58] Field of Search ............. 219/121.39, 121.44, 219/121.48, 158–161, 121.67, 121.49; 266/48, 65

[56] References Cited

U.S. PATENT DOCUMENTS

| | | | |
|---|---|---|---|
| 3,743,260 | 7/1973 | Alleman et al. | 266/65 |
| 3,828,159 | 8/1974 | Zoot | 219/121.67 |
| 4,063,059 | 12/1977 | Brolund et al. | 219/121.39 |
| 4,338,507 | 7/1982 | Scott | 219/121.39 |

Primary Examiner—Mark H. Paschall
Attorney, Agent, or Firm—John R. Benefiel

[57] ABSTRACT

A slag chute system for a hot cutting discharge device, including upper and lower removable tubular liner sections aligned below the hot cutting discharge, the internal bores of which are chrome plated and polished to resist adhesion of spatter. A removable annular insert ring surrounds the jet and has a smaller diameter opening than the inside diameter of the upper chute liner section, which in turn is smaller than the internal diameter of the lower chute liner section to produce a stepped diameter chute.

11 Claims, 2 Drawing Sheets

SLAG CHUTE SYSTEM

This invention concerns chutes for collecting spatter generated by cutting of a workpiece using the application of a hot discharge, as generated by a plasma arc or laser system. The slag generated by cutting is typically collected into a spatter confining chute located beneath a table on which the workpiece is supported, the chute protecting adjacent surfaces.

The spatter tends to adhere to the chute surfaces and thus build up typically necessitating a periodic, time consuming disassembly of the machine to clean or replace the chute.

Such problems have led to the development of a water quenched collection system as described in U.S. Pat. No. 4,338,507, in which a surounding stream of water is circulated over the walls of a chute to intercept the slag particles, cooling the same and continuously washing the walls of the chute.

Such water curtain system is complex and itself creates maintainence problems due to the pressure of circulating water in the machine leading to leakage and corrosion.

SUMMARY OF THE INVENTION

The present invention comprises a system of readily removable chute liner sections, the internal surface of each of which have a smooth surface finish which tends to defeat adhesion of spatter particles thereto, the preferred finish being a highly polished hard chrome plating.

The liner system includes a relatively short length, smaller diameter upper section nested separably within a relatively longer length and larger diameter lower section.

The upper section is supported on a lip at the bottom of a first tubular holder piece attaced beneath a support plate fit into the workpiece supporting table. An insert ring is removably received into a tapered opening formed in the support plate. The insert ring has a central discharge opening aligned with the plasma arc or other heat cutting jet or discharge, which is concentric with the liner sections.

The insert ring may be pulled out of the tapered opening to be cleaned and to also enable ready removal of the upper chute liner section for cleaning.

The lower liner is supported immediately below the upper liner on a lip of a lower separable holder piece concentric to and surrounding the lower end of the upper holder piece liner section.

The lower liner section can also be readily removed by disassembly of the planar piece from the table and removal of the upper liner section and first holder piece. This allows the lower section to be lifted out of the second holder piece for cleaning or replacement.

The non-adhering surface of the liner sections minimizes building up of slag. The accumulation of slag is mainly confined to the upper section, since the lower section internal surface is disposed below and outward from that of the upper section to be much less exposed to the slag spray.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
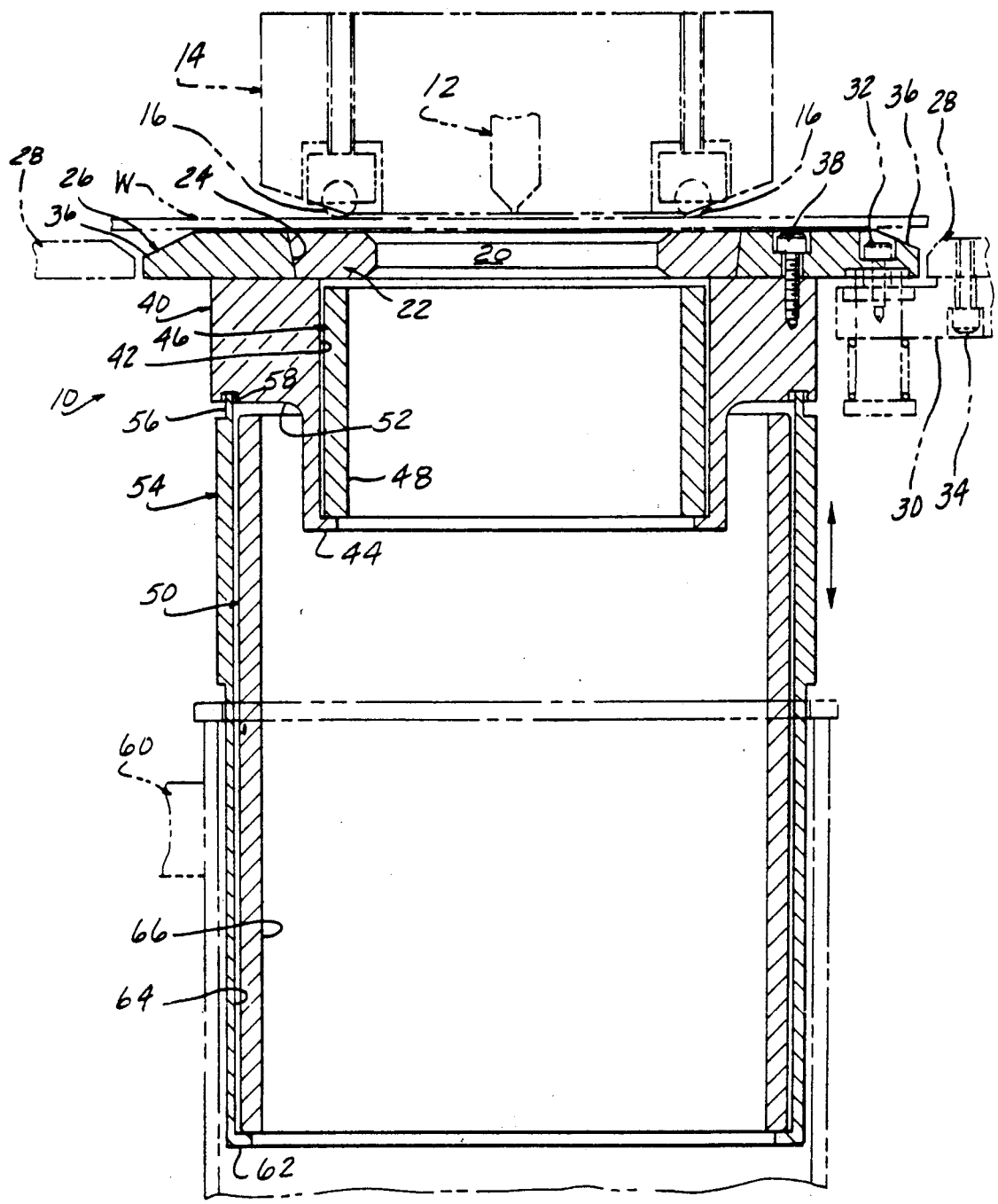
FIG. 1 is a sectional view of a cutting torch slag collection chute system according to the present invention.
Figure 2:
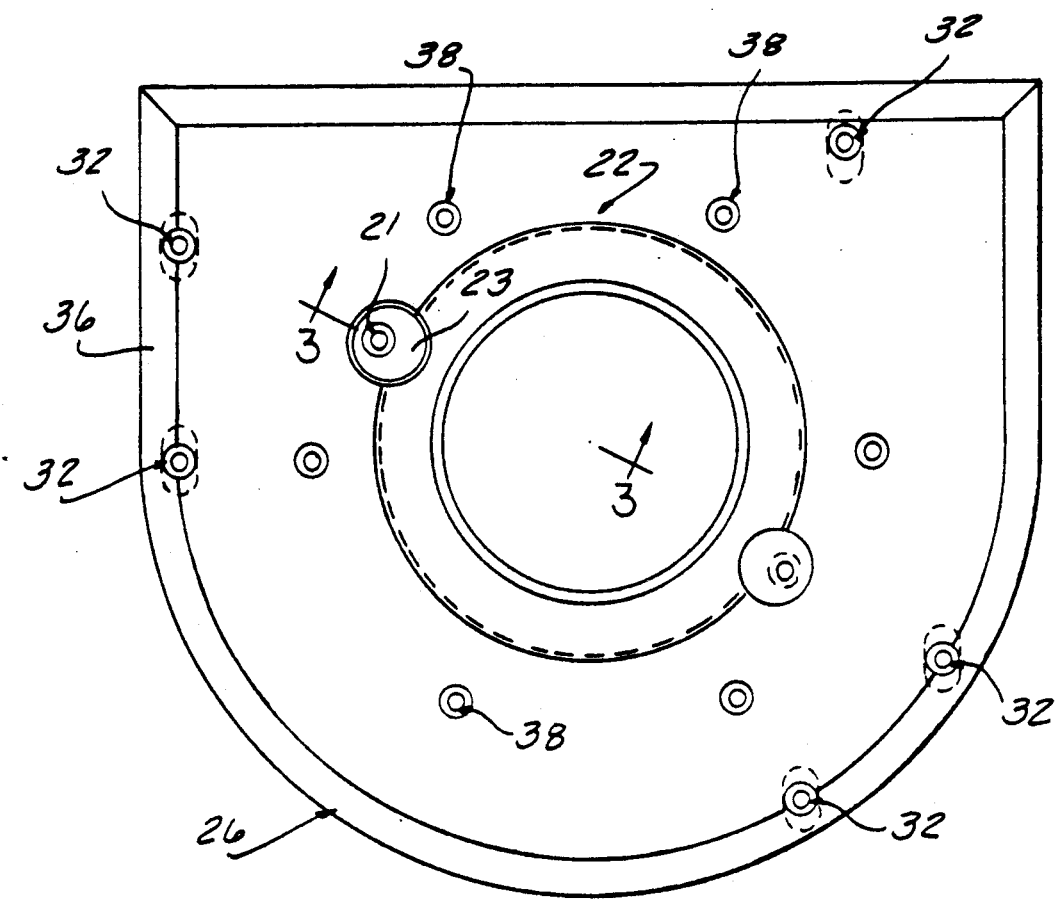
FIG. 2 is a plan view of the planar support piece mounted into the workpiece support table.
Figure 3:
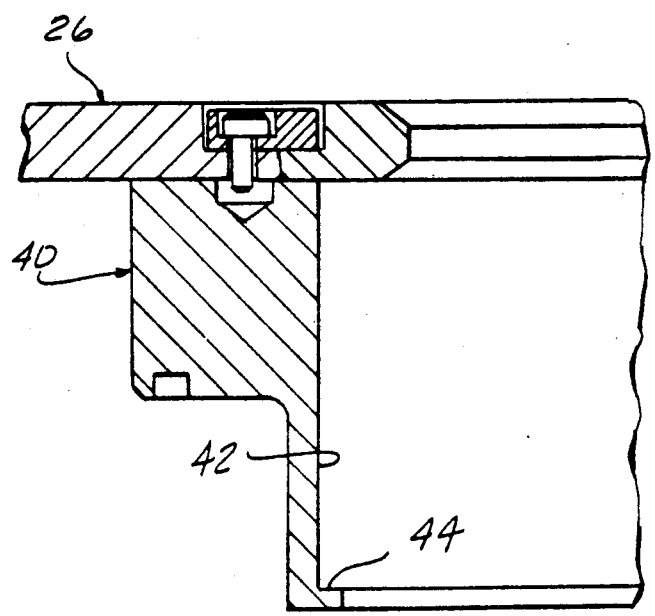
FIG. 3 is a view of the section 3—3 taken in FIG. 2.

Referring to FIG. 1, the chute system 10 according to the present invention has application to a hot discharge cutting apparatus in which a device for generating a hot cutting jet or discharge, such as a plasma arc generator 12, is supported above a workpiece W, as by a vertically movable carriage 14. Roller balls 16 bear on the workpiece W to maintain the correct slightly separated relative vertical spacing of the workpiece W and plasma arc generator 12 as their lateral position is shifted to carry out the cutting process.

The plasma arc generator 12 is aligned with an opening 20 in an annular insert ring 22. Insert ring 22 is in turn loosely fit into a tapered opening 24 in a support plate 26, the support plate 26 recessed into a workpiece support table 28 and attached thereto by means of bridging blocks 30 secured to the support table 28 and support plate 26 with capscrews 32, 34.

The periphery of the support plate 26 has chamfered shoulders 36 to facilitate movement of the workpiece W therepast, which should also be smoothly finished and plated to minimize marring of the surface thereof.

Fastened immediately beneath the support plate 26 by capscrews 38, is an upper holder piece 40. Upper holder piece 40 is cup like, having a central bore 42 aligned with the discharge opening 20 in the insert ring but of larger diameter, bore 42 terminating in an inwardly turned lip 44 at the bottom thereof.

Loosely fit into the bore 42 and approximately coextensive therewith is an upper chute liner section 46, resting on the lip 44. The upper chute liner section 46 is open ended and tubrlar in shape, with the inner bore 48 larger in diameter than the discharge opening 20 in the insert ring 22, aligned with the opening 20 and the plasma arc generating 12 so as to surround the cutting jet and enclose the slag forming spatter produced during cutting of the workpiece W.

The surface of the internal bore 48 is finished so as to minimize adhesion of spatter. An effective surface finish has been found to be a hard chrome plating, highly polished, on the order of 16 microinch rms. A suitable chrome plating is commercially available under the trademark "ARMOLOY" (TM). This finish resists adhesion so that the build up of slag is resisted.

The upper chute liner section 46 is easily removed for cleaning or replacement by merely lifting out insert ring 22 and then the chute liner section 46. The insert ring 22 may thus also be conveniently cleaned of accumulated slag.

An open ended tubular lower chute liner section 50 is also provided, aligned with the upper chute line section 46, but of a larger diameter and overlapping the same by being received in a space formed by a shoulder 52 on the upper holder piece 40. A lower holder piece 54 has a locating rim 56 received into a groove 58 machined into the shoulder 52 of the upper holder piece 40. This allows separation of the upper and lower holder pieces and liner sections. This separability makes the system compatible with arrangements (not shown) allowing lowering and tilting of the support plate 26 to remove the cut pieces from the workpiece W.

The lower holder piece 54 is slideably mounted to fixed bracketry 60, and has an inwardly turned lip 62 at the bottom, adapted to hold the lower chute liner section 50, loosely received in a bore 64 of the lower holder piece 54.

The slag passes out through the open bottom of the lower chute liner section 50 to a conventional collection apparatus (not shown).

The internal bore 66 of the lower chute liner section 50 is likewise finished to resist adhesion of the slag spatter, such as by the polished hard chrome plating described above.

The greater diameter and lower location of the lower chute liner section 50 has been found to result in a much lesser need for removal and cleaning. In the event such is needed, the support plate 26 is removed, with the upper holder piece 40 and chute liner section 46, after elevation of the carriage 14, enabling the lower chute liner section 50 to be removed by tilting past the elevated carriage 14.

The increasing diameters of the opening 20, internal bore and internal bore 66 create a stepped section chute, each section of lesser slag accumulation of the successive elements in the chute system.

Accordingly, a much simpler arrangement has been provided over water curtain protected slag chutes, which does not necessitate excessive maintainence requirements.

We claim:

1. In an apparatus for cutting a workpiece by a device generating a hot discharge, a workpiece supported on a support table, said table having a planar support means formed with a discharge opening aligned with said device generating a cutting discharge to receive said hot discharge, a spatter confining chute, including:
   a hollow holder piece secured immediately below said discharge opening in said support means, said holder piece having a bore aligned with said support discharge opening;
   an opened ended tubular upper chute liner section loosely fit within and substantially co-extensive with said holder piece bore and supported therein to be able to be readily removed, said upper chute liner section having an internal bore aligned with said discharge opening in said support means said internal bore of larger diameter than said opening, whereby the internal bore of said upper liner section receives and confines the spatter from said cutting of said workpiece.

2. The apparatus according to claim 1 wherein said upper liner section has an internal bore with the surface finished with hard chrome.

3. The apparatus according to claim 2 wherein said chrome plated surface is polished to a smoothness on the order of 16 microinch rms.

4. The apparatus according to claim 1 wherein said support means includes a support plate and an annular insert ring removably fit into an outer opening in said support plate, said insert ring defining said discharge opening aligned with said cutting discharge device.

5. The apparatus according to claim 4 wherein said outer opening is of larger diameter than the diameter of said upper chute liner section to enable lift out of said liner therethrough.

6. The apparatus according to claim 4 further including an open ended tubular lower chute liner section mounted below and aligned with said upper chute liner section.

7. The apparatus according to claim 5 wherein said lower chute liner section has an internal bore surface plated with hard chrome.

8. The apparatus according to claim 7 wherein said chrome plated internal bore surface of said lower chute liner section is polished to a smoothness on the order of 16 microinch rms.

9. The apparatus according to claim 6 wherein said lower chute liner section has an internal bore of larger diameter than said upper chute liner section, the bottom of said upper section received within said lower chute liner section to produce a stepped diameter chute.

10. The apparatus according to claim 9 further including a hollow lower holder piece, said lower chute liner section loosely fit and held within said lower holder piece.

11. The apparatus according to claim 10, wherein said lower holder piece has a slot in the lower end thereof, an upper edge of said lower holder piece separably interfit into said groove.

* * * * *

UNITED STATES PATENT AND TRADEMARK OFFICE
CERTIFICATE OF CORRECTION

PATENT NO. : 5,053,600

DATED : October 1, 1991

INVENTOR(S) : Victor L. Chun et al

It is certified that error appears in the above-identified patent and that said Letters Patent is hereby corrected as shown below:

Column 1, line 17, "surounding" should be --surrounding--.

Column 1, line 38, "attaced" should be --attached--.

Column 2, line 44, "tubrlar" should be --tubular--.

Column 3, line 27, "bore and" should be --bore 48 and--.

Column 3, line 45, "opened" should be --open--.

Signed and Sealed this

Ninth Day of March, 1993

*Attest:*

STEPHEN G. KUNIN

*Attesting Officer*     Acting Commissioner of Patents and Trademarks